(12) United States Patent
Langhammer et al.

(10) Patent No.: US 7,484,081 B1
(45) Date of Patent: Jan. 27, 2009

(54) METHOD AND APPARATUS FOR PROTECTING DESIGNS IN SRAM-BASED PROGRAMMABLE LOGIC DEVICES

(75) Inventors: Martin Langhammer, Poole (GB);
Gregory R. Steinke, San Jose, CA (US);
Guy R. Schlacter, Buffalo Grove, IL (US); Bernd Neidermeier, Munich (DE)

(73) Assignee: Altera Corporation, San Jose, CA (US)

( * ) Notice: Subject to any disclaimer, the term of this patent is extended or adjusted under 35 U.S.C. 154(b) by 1108 days.

(21) Appl. No.: 09/975,094

(22) Filed: Oct. 10, 2001

Related U.S. Application Data (60) Provisional application No. 60/239,465, filed on Oct. 10, 2000.

(51) Int. Cl.
*G06F 9/00* (2006.01)
(52) U.S. Cl. ............... 713/1; 380/44; 326/8; 711/159; 711/164
(58) Field of Classification Search ............ 326/8; 380/44; 713/184, 1; 711/159, 164, 163; 726/21, 30
See application file for complete search history.

(56) References Cited

U.S. PATENT DOCUMENTS

| | | | | |
|---|---|---|---|---|
| 4,609,986 A | 9/1986 | Hartmann et al. | ........... | 364/200 |
| 4,617,479 A | 10/1986 | Hartmann et al. | ........... | 307/465 |
| 4,642,487 A | 2/1987 | Carter | ........... | 307/465 |
| 4,677,318 A | 6/1987 | Veenstra | ........... | 307/465 |
| 4,706,216 A | 11/1987 | Carter | ........... | 365/94 |
| 4,713,792 A | 12/1987 | Hartmann et al. | ........... | 364/900 |

(Continued)

OTHER PUBLICATIONS

Michael Barr: "How Programmable Logic Works", Embedded Systems Programming, Jun. 1999, pp. 75-84. In the paragraph entitled; "Device Programming".*

(Continued)

*Primary Examiner*—Emmanuel L Moise
*Assistant Examiner*—Paul Callahan
(74) *Attorney, Agent, or Firm*—Weaver Austin Villeneuve & Sampson LLP (57) ABSTRACT

Various techniques for controlling use of configuration data for and/or a design implemented as user logic in a configurable PLD (programmable logic device) include programming the configurable PLD using configuration data provided by a secure device. The programmed configurable PLD includes user logic, a configurable device authorization code generator and a comparator. The user logic is immediately disabled after it is loaded into the configurable device. A configurable device authorization code is generated in the configurable device authorization code generator in the programmed configurable PLD and is sent to the comparator. A secure device authorization code is generated by a secure device authorization code generator and also is sent to the comparator. The comparator compares the two inputs and, if the configurable device authorization code and secure device authorization code are identical, the user logic is then enabled. The configurable device authorization codes and secure device authorization codes may be generated in various ways, including using pseudo-random number generators, encryptors and/or decryptors in combination in the configurable device and the secure device. Various apparatus for implementing the present invention include a secure device configured to generate a secure device signal on which the secure device authorization code is based and a configuration data storage which provides programming instructions for controlling use of configuration data that generates the user logic and required functionalities in the configurable device.

31 Claims, 10 Drawing Sheets

U.S. PATENT DOCUMENTS

| | | | |
|---|---|---|---|
| 4,774,421 A | 9/1988 | Hartmann et al. | 307/465 |
| 4,871,930 A | 10/1989 | Wong et al. | 307/465 |
| 4,899,067 A | 2/1990 | So et al. | 307/465 |
| 4,912,342 A | 3/1990 | Wong et al. | 307/465 |
| 5,033,084 A | 7/1991 | Beecher | 380/4 |
| 5,081,675 A | 1/1992 | Kittirutsunetorn | 380/4 |
| 5,121,006 A | 6/1992 | Pederson | 307/468 |
| 5,148,485 A | 9/1992 | Dent | 380/49 |
| 5,177,790 A | 1/1993 | Hazard | 390/28 |
| 5,220,214 A | 6/1993 | Pederson | 380/28 |
| 5,260,610 A | 11/1993 | Pederson et al. | 380/46 |
| 5,260,611 A | 11/1993 | Cliff et al. | 307/465 |
| 5,350,954 A | 9/1994 | Patel | 307/465 |
| 5,371,422 A | 12/1994 | Patel et al. | 326/41 |
| 5,388,157 A | 2/1995 | Austin | 380/4 |
| 5,450,022 A | 9/1995 | New | 326/39 |
| 5,457,408 A * | 10/1995 | Leung | 326/38 |
| 5,479,512 A | 12/1995 | Weiss | 380/28 |
| 5,513,262 A | 4/1996 | Van Rumpt et al. | 380/29 |
| 5,548,228 A | 8/1996 | Madurawe | 341/63 |
| 5,563,592 A | 10/1996 | Cliff et al. | 326/38 |
| 5,581,198 A | 12/1996 | Trimberger | 341/63 |
| 5,594,793 A * | 1/1997 | Bahout | 713/193 |
| 5,636,281 A | 6/1997 | Antonini | 380/25 |
| 5,768,372 A * | 6/1998 | Sung et al. | 713/193 |
| 5,778,070 A * | 7/1998 | Mattison | 713/191 |
| 5,799,085 A * | 8/1998 | Shona | 713/169 |
| 5,828,753 A | 10/1998 | Davis | 380/49 |
| 5,835,594 A * | 11/1998 | Albrecht et al. | 713/187 |
| 5,838,901 A * | 11/1998 | Curd et al. | 726/26 |
| 5,844,986 A * | 12/1998 | Davis | 713/187 |
| 5,889,266 A * | 3/1999 | Schrenk | 235/380 |
| 5,915,017 A | 6/1999 | Sung et al. | 380/3 |
| 5,970,142 A | 10/1999 | Erickson | 380/44 |
| 5,991,880 A * | 11/1999 | Curd et al. | 726/28 |
| 5,995,623 A | 11/1999 | Kawano et al. | 380/21 |
| 6,118,869 A | 9/2000 | Kelem et al. | 380/28 |
| 6,122,378 A | 9/2000 | Yoshiura et al. | 380/44 |
| 6,662,283 B1 * | 12/2003 | Brun et al. | 711/163 |
| 6,981,153 B1 * | 12/2005 | Pang et al. | 713/194 |

OTHER PUBLICATIONS

Minnick, R.C., "A Survey of Microcellular Research," Journal of Association for Computing Machinery, vol. 14, No. 2, pp. 203-241, Apr. 1967.

Wahlstrom, S.E., "Programmable Logic Arays—Cheaper by the Millions," Electronics, Dec. 11, 1967, pp. 90-95.

A. Mukhopadhyay, Recent Developments in Switching Theory, ed., Academic Press, Chapters VI-IX, pp. 229-254 and 369-422, 1971.

* cited by examiner

METHOD AND APPARATUS FOR PROTECTING DESIGNS IN SRAM-BASED PROGRAMMABLE LOGIC DEVICES

CROSS-REFERENCE TO RELATED APPLICATIONS

This application claims priority of provisional U.S. Patent Application Ser. No. 60/239,465 filed Oct. 10, 2000, titled "Method and Apparatus for Protecting Designs in SRAM-Based Programmable Logic Devices" under 35 U.S.C. § 119 (e) which is incorporated herein by reference.

BACKGROUND OF THE INVENTION

1. Field of the Invention

This invention relates generally to methods, systems, machine readable media and apparatus for protecting intellectual property ("IP"). More specifically, this invention relates to techniques for protecting designs and/or configuration data in SRAM-based programmable logic devices and similar configurable devices.

2. Description of Related Art

A programmable logic device (PLD) is a programmable integrated circuit that allows the user of the circuit, using software control, to customize the logic functions the circuit will perform. Examples of PLDs are FPGAs (Field Programmable Gate Arrays) and EPLDs (Erasable Programmable Logic Devices). The logic functions previously performed by small, medium and large scale integration integrated circuits can instead be performed by programmable logic devices. Programmable logic devices supplied by integrated circuit manufacturers like Altera Corporation of San Jose, Calif. (a more detailed description of these products can be found at "www.altera.com") are not inherently capable of performing any specific function. The user, in conjunction with software supplied by the PLD manufacturer, can program the PLD to perform the specific function or functions required by the user's application. The PLD then can function in a larger system designed by the user, just as though dedicated logic chips were employed.

A typical PLD consists of an array of logic cells that can be individually programmed and arbitrarily interconnected to each other to provide internal input and output signals, thus permitting the performance of highly complex combinational and sequential logic functions. The program is implemented in the PLD by setting the states of programmable elements such as memory cells. These memory cells may be implemented with volatile memories, such as SRAMs, which lose their programmed states upon termination of power to the system. If the programmable elements used are volatile memories, the memory cells must be configured upon each system power-up in order to configure the PLD.

In this disclosure, a "configurable device" or "configurable PLD" is defined to be a programmable device that ultimately contains the user logic (that is, the function(s) programmed and implemented in a PLD by a user). Typically, such a device has a volatile memory and must be programmed upon each power-up, though not every configurable device must possess these characteristics. Examples of configurable devices include SRAM PLDs and RAM-based PLDs (for example, Altera FLEX devices).

Moreover, in this disclosure, a "secure device" is defined to be a non-volatile programmable device, a custom logic device, a microprocessor or other similar device that is a secure device (that is, a device from which a design cannot be directly determined or read out of the device, such as an Altera MAX device) and which installs user logic and possibly other functionalities into a configurable device (as defined above) from a configuration data memory (a "storage device"). As noted below, a storage device may be a component separate and distinct from a secure device or the two devices may be integrated to some degree in a single component. Where a storage device and a secure device are distinct, the two devices may be connected by a secure link to prevent copying of data transferred between the two devices.

To use a configurable PLD (such as an SRAM-based FPGA), a user captures a circuit design using any of several design capture tools and then uses software tools to convert the captured design into a specific bitwise representation which can be stored in a storage device, such as an EEPROM. Upon startup, the storage device supplies the bitwise representation to the configurable PLD, typically under the control of a secure device, enabling the configurable PLD to perform the function of the programmed circuit design.

In some cases, the configuration data in a storage device is a bitwise representation that, when installed by a secure device, such as an EEPROM PLD, into a configurable device, such as an SRAM PLD, can implement user logic and possibly other functionalities to be used by the configurable device. However, the configuration data may also take on other formats and these are considered to be within the scope of the present invention. For example, either or both of the configurable device and the secure device might include an integrated microprocessor. Part of the configuration data would then be computer code that would be used by the microprocessors. The microprocessors could implement the functionality of random number generators, encryption and decryption circuits, and comparators that might otherwise be implemented with logic. The actual user logic in the configurable device would still be implemented in the normal fashion—just the configuration security circuits would be implemented with the microprocessors. Any appropriate manner of storing and using configuration data is deemed to fall within the a meaning of the term "configuration data" in this disclosure.

By the time a bitwise representation is created, it represents significant amounts of time, money and effort. To encourage individuals and companies to continue to invest in the research and development of new circuit designs, and to protect the investment represented by existing completed designs, it is desirable to provide some method of protecting the circuit designs from illegal or otherwise unauthorized copying and/or use.

To make an illegal copy of the circuit design, as implemented in a configurable logic device, one need only make a copy of the bitwise representation stored in the storage device. This can be done by copying the bitstreams transmitted externally between a configurable device and the device installing the configuration data and using the copies bitstream with a copied configurable device. Thus, the copied bitwise representation can be illegally used with other programmable logic devices. Therefore, it is desirable to make it more difficult to copy the bitwise representation of the circuit design.

Several techniques have been developed to address the illegal copying of PLD programming software by users. While these efforts have met with some success, they have some shortcomings.

As noted above, microprocessors can been used to configure PLDs prior to operation. However, implementing a microprocessor to configure the device does not address the security issue. A microprocessor must still externally transmit the configuration data to the configurable PLD. The configuration data is of finite length and can therefore be captured and used to configure another device without authority from the design's owner.

Figure 1:
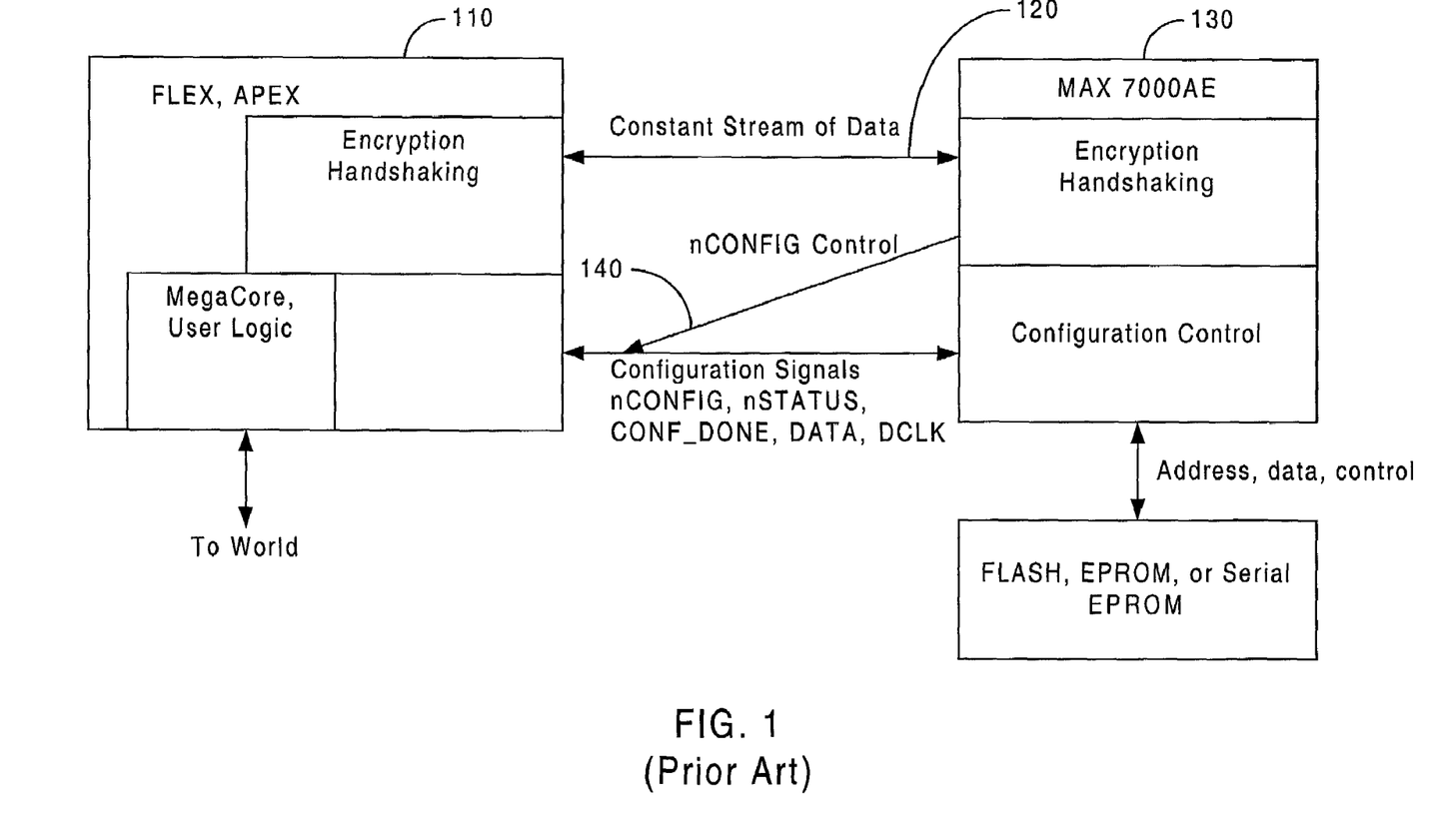
FIG. 1 is a schematic diagram showing a prior art design of a configuration security system.

In another prior technique, a configuration of which is shown in FIG. 1, the device being programmed 110 sends a constant stream of data 120 to a control device 130. If the data stream is not correct, the control device 130 can assert a reconfiguration signal 140 and stop operation of the programmable device 110. The data stream 120 can be generated in a number of different ways to prevent decoding of the data stream's pattern. However, if the reconfiguration signal is disconnected, the control device loses power over the device being programmed. While some measures can be taken to try and monitor the status of the devices' link, unscrupulous users can still circumvent these protective measures. Furthermore, the configuration data that is driven to the configurable PLD could be captured and used to configure the configurable PLD without the control device 130.

Another technique for combating the theft of design software is found in U.S. Pat. No. 5,970,142. In that design, the configurable device generates an encryption key which is transmitted to the control device (also referred to as a storage device in the '142 patent). An encryption circuit in the control device encrypts all of the configuration data which is then sent to the PLD. The PLD subsequently decrypts the entire configuration data and uses the decrypted configuration data to program the PLD user logic. As will be appreciated, the system requires that all of the configuration data be encrypted and decrypted completely. This approach also requires either that special circuitry be incorporated into the PLD and the storage device or that unencrypted data be used to configure part of the configurable device before transfer of the encrypted configuration data. Configuration data cannot be used to create a decryptor in the configurable PLD since that data is encrypted before it is sent to the configurable PLD. As will be appreciated, this technique cannot be practically "retrofitted" into existing configurable PLD systems, due to the special circuitry and/or multiple configuration steps needed for its implementation.

Techniques that permit full use of designs and configuration data while protecting the proprietary interests of the owners of the intellectual property incorporated in such designs, systems and devices would represent a significant advancement in the art.

BRIEF SUMMARY OF THE INVENTION

The present invention provides the owner of configuration data for and/or designs in SRAM-based programmable logic devices and the like with systems, methods, machine readable media and apparatus to protect such configuration data and designs from unauthorized copying and/or use.

Generally, methods and systems for controlling use of a design implemented as user logic in a programmed configurable device include programming the configurable device using configuration data provided by a secure device. The programmed configurable device includes user logic, a configurable device authorization code generator and a comparator. The user logic is immediately disabled after it is loaded into the configurable device. A configurable device authorization code is generated in the configurable device authorization code generator and is sent as one input to the comparator. A secure device authorization code is generated by a secure device authorization code generator and is sent as a second input to the comparator. The comparator compares the two inputs and, if the configurable device authorization code and secure device authorization code are identical, the user logic is then enabled.

The authorization codes can be generated in various ways. In one embodiment, the configurable device and secure device each have a pseudo-random number generator (RNG). The configurable device RNG is a duplicate of the secure device RNG. A sequence generated by the secure device RNG is the secure device authorization code and is sent to the comparator to be compared with the sequence generated by the configurable device RNG (the configurable device authorization code).

In another embodiment, the sequence generated by the secure device RNG is encrypted to generate a secure device signal which is sent to a decryptor in the configurable device. The decryptor decrypts the secure device signal to generate a secure device authorization code which is sent to the comparator.

In still a different embodiment, the configurable device does not contain its own RNG. Rather, a secure device RNG generates a first sequence that is sent directly to the comparator as the secure device authorization code. The same first sequence is encrypted in the secure device and sent to a decryptor in the configurable device. The decryptor decrypts the encrypted sequence and the decryptor's output (the configurable device authorization code) is compared to the secure device authorization code.

In one other embodiment, the configurable device contains a single RNG that generates an original sequence that constitutes the configurable device authorization code and is one input to the comparator. The same original sequence is sent to an encryptor in the secure device, after which the encrypted sequence (the secure device signal) is sent back to a decryptor in the configurable device where it is decrypted to generate the secure device authorization code. The secure device authorization code is compared to the configurable device authorization code.

In each embodiment, if the two authorization code inputs presented to the comparator match, then the user logic is enabled. If the inputs do not match, or if at least one of the inputs is missing, the user logic remains disabled.

Apparatus according to the present invention includes a secure device configured according to the embodiments described above. The apparatus further comprises a machine readable configuration data storage medium on which is provided programming instructions for implementing the configurable device functionalities described above in connection with each embodiment.

Further details and advantages of the invention are provided in the following Detailed Description and the associated figures.

BRIEF DESCRIPTION OF THE SEVERAL VIEWS OF THE DRAWING

The present invention will be readily understood by the following detailed description in conjunction with the accompanying drawings, wherein like reference numerals designate like structural elements, and in which.

DETAILED DESCRIPTION OF THE INVENTION

The following detailed description of the invention will be with reference to one or more embodiments of the invention, but is not limited to such embodiments. The detailed description is intended only to be illustrative. Those skilled in the art will readily appreciate that the detailed description given herein with respect to the Figures is provided for explanatory purposes as the scope of the present invention extends beyond these embodiments. For example, the present invention is described in connection with an SRAM PLD configurable device (for example, an Altera FLEX device) and an EEPROM PLD secure device (for example, an Altera MAX device). However, another type of configurable device having volatile or non-volatile memory characteristics could be substituted for the SRAM PLD. Similarly, other secure devices having non-volatile memory characteristics could be substituted for the EEPROM PLD, so long as appropriate security measures are employed (for example, setting the security bit in an Altera MAX device). Also, an ASIC or other custom chip can be used in place of the EEPROM PLD used as an example herein. Consequently, the present invention is not limited solely to the SRAM PLD/EEPROM PLD pair disclosed.

The present invention allows the owner of intellectual property ("IP") in the form of configuration data for a configurable PLD to protect against unauthorized use of the IP. A party generally will be unable to use a PLD incorporating the configuration data unless that party has authority to use the configuration information in a programmable device. Consequently, the proprietary interests of the IP owner are better protected because a party will not be able to use the configuration information without appropriate authorization.

Generally, embodiments of the present invention may employ various processes involving data stored in or transferred through one or more computer systems. Embodiments of the present invention also may relate to a hardware device or other apparatus for performing these operations. This apparatus may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the required method steps. A particular structure for a variety of these machines will be apparent to those of ordinary skill in the art based on the description given below.

In addition, embodiments of the present invention relate to computer readable media or computer program products that include program instructions and/or data (including data structures) for performing various computer-implemented operations. Examples of computer-readable media include, but are not limited to, magnetic media such as hard disks, floppy disks, and magnetic tape; optical media such as CD-ROM disks; magneto-optical media; semiconductor memory devices, such as Flash, EPROM, and EEPROM memories, and hardware devices that are specially configured to store program instructions and data, such as read-only memory devices (ROM) and random access memory (RAM). The data and program instructions of this invention may also be embodied on a carrier wave or other transport medium. Examples of program instructions include both machine code, such as produced by a compiler, and files containing higher level code that may be executed by the computer using an interpreter.

Figure 2:
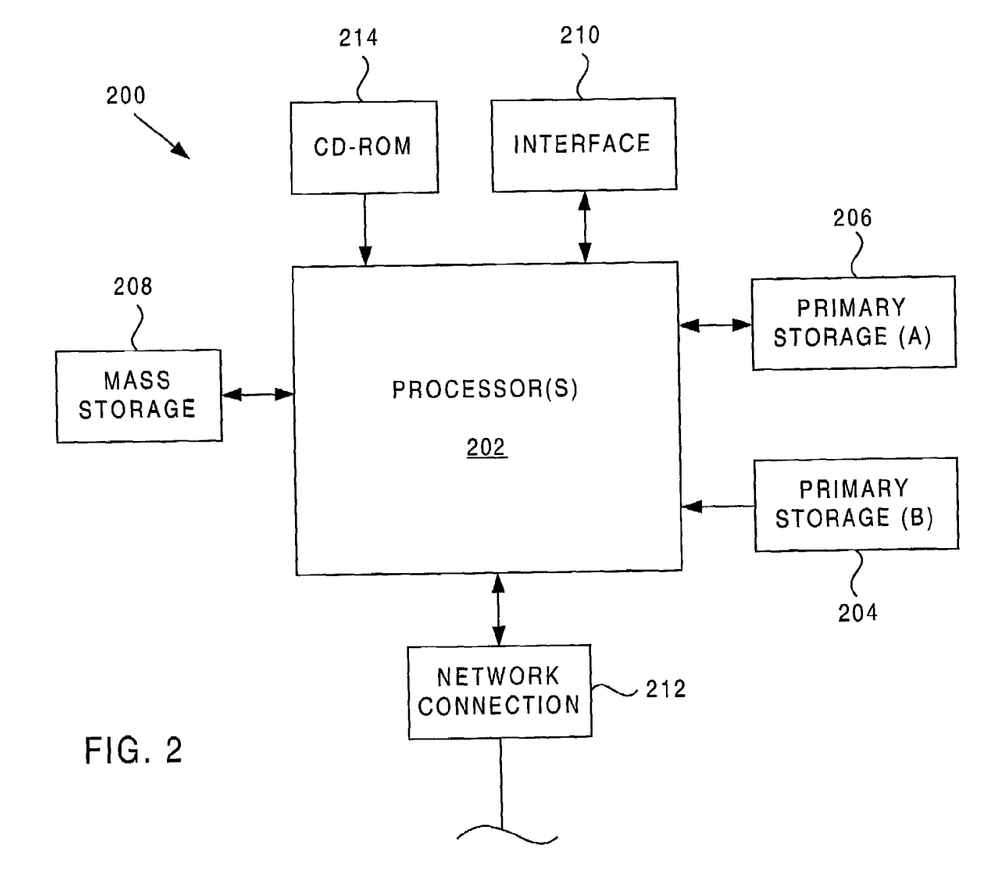
FIG. 2 is a schematic diagram showing a computer system that can be used in connection with the present invention.

FIG. 2 illustrates a typical computer system that, when appropriately configured or designed, can serve as an apparatus of this invention. The computer system 200 includes any number of processors 202 (also referred to as central processing units, or CPUs) that are coupled to storage devices including primary storage 206 (typically a random access memory, or RAM), primary storage 204 (typically a read only memory, or ROM). CPU 202 may be of various types including microcontrollers and microprocessors such as programmable devices (e.g., CPLDs and FPGAs) and unprogrammable devices such as gate array ASICs or general purpose microprocessors. As is well known in the art, primary storage 204 acts to transfer data and instructions uni-directionally to the CPU and primary storage 206 is used typically to transfer data and instructions in a bi-directional manner. Both of these primary storage devices may include any suitable computer-readable media such as those described above. A mass storage device 208 is also coupled bi-directionally to CPU 202 and provides additional data storage capacity and may include any of the computer-readable media described above. Mass storage device 208 may be used to store programs, data and the like and is typically a secondary storage medium such as a hard disk. It will be appreciated that the information retained within the mass storage device 208, may, in appropriate cases, be incorporated in standard fashion as part of primary storage 206 as virtual memory. A specific mass storage device such as a CD-ROM 214 may also pass data uni-directionally to the CPU.

CPU 202 also is coupled to an interface 210 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 202 optionally may be coupled to an external device such as a database or a computer or telecommunications network using an external connection as shown generally at 212. With such a connection, it is contemplated that the CPU might receive information from the network, or might output information to the network in the course of performing the method steps described herein.

In one embodiment, a system such as computer system 200 used by a customer is in communication with a similar computer system managed by the IP owner. Information and programs, including configuration information files and other files can be provided via an interface 212 for downloading by the customer. Alternatively, such information, programs and files can be provided to a customer on a storage device. Once in a customer's possession, a memory device such as primary storage 206 or mass storage 208 buffers or stores, at least temporarily, a configuration information file or other data. The customer also may obtain one or more SRAM PLDs and at least one EEPROM PLD from a suitable source. The details of how IP owners and customers use the present inventions and this equipment are discussed in more detail below.

As mentioned above, the present invention can be used in a variety of ways to limit use of the owner's configuration IP. For purposes of this discussion, the embodiments of the present invention will be described in the context of limiting use of configuration information in connection with an SRAM PLD (a "configurable device") with configuration data supplied from an EEPROM PLD (a "secure device"). While the embodiments disclosed herein provide examples of how the present invention can be used, these examples are in no way limiting with respect to the scope of the invention.

In one embodiment of the present invention, a configurable device, such as an SRAM PLD or similar device, requires confirmation that the device programming the programmable device has authority to use the configuration data. An SRAM PLD can be programmed in known ways by a secure device, such as an EEPROM PLD or similar device. The EEPROM PLD typically reads the configuration/programming data from a discrete non-volatile memory (for example, Flash, EEPROM, EPROM). In one embodiment of the present invention, the EEPROM PLD programs the SRAM PLD in a conventional manner. The EEPROM PLD has a control module that transmits configuration data from the configuration data memory to the SRAM PLD via a suitable link. The configuration data memory typically is separate from the EEPROM PLD, but could be integrated into the EEPROM PLD in some fashion, making the secure device and configuration memory a single component. Once the SRAM PLD has received the configuration data and has been programmed, the user logic installed in the SRAM PLD is immediately disabled in one of a number of ways familiar to those of skill in the art. The SRAM PLD user logic remains disabled pending the SRAM PLD's authentication, verification or authorization of the source of the SRAM PLD's programming. As discussed in more detail below, if the programming device's authentication, verification or authorization is incorrect or missing, the SRAM PLD user logic remains disabled and unusable.

Figure 3A:
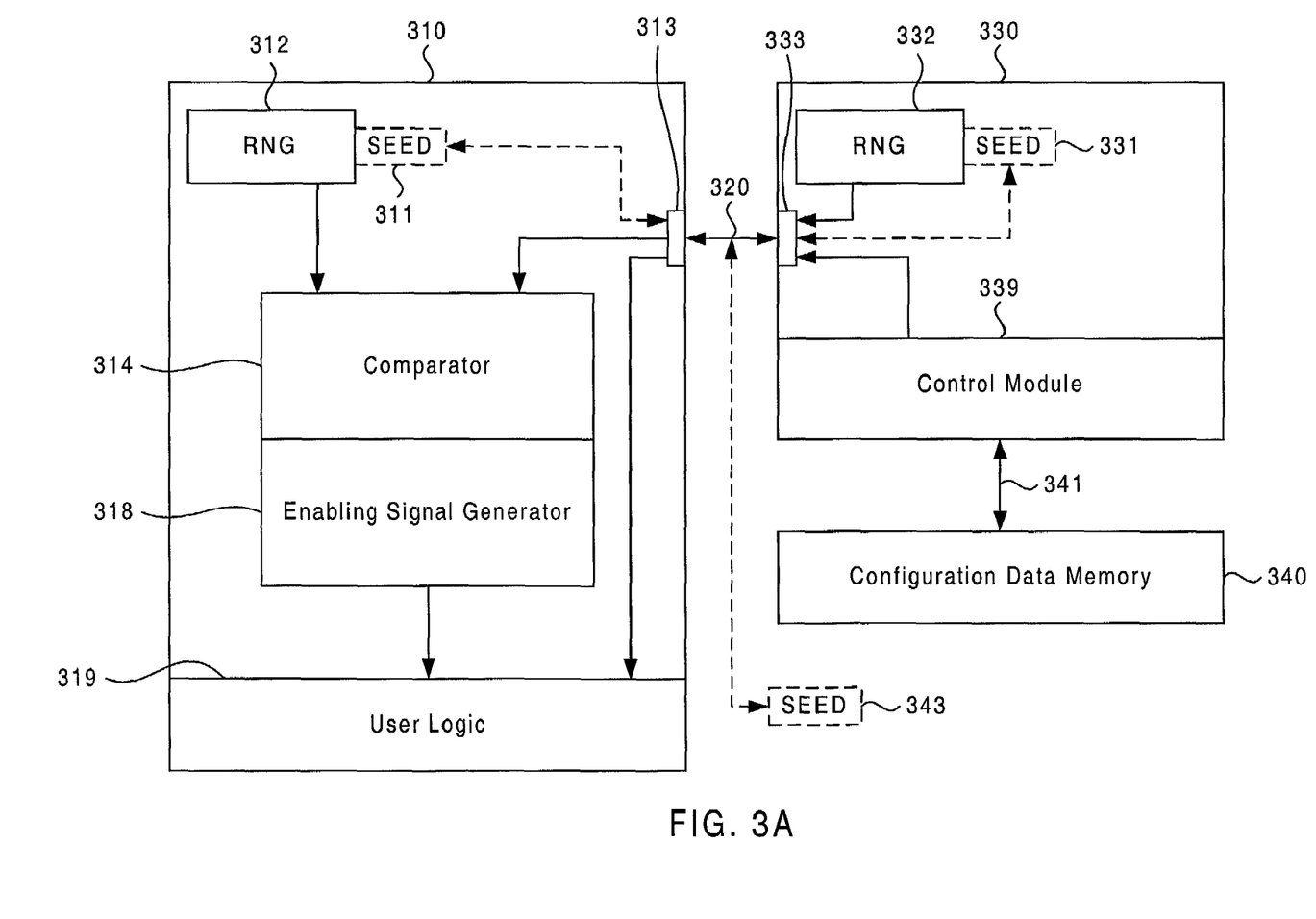
FIG. 3A is a schematic diagram of one embodiment of the present invention.

As seen in FIG. 3A, a programmed SRAM PLD 310 contains a pseudo-random number generator (RNG) 312, a data interface 313, a comparator 314, an enabling signal generator 318 and user logic 319. Here, the configuration data implements not only the user logic 319, but also the configurable device components and/or functionalities of the authorization system (in FIG. 3A, the configurable device components of the authorization system are the RNG 312, comparator 314, enabling signal generator 318 and, if used, the seed generator 311). The RNG 312 is connected directly to the comparator 314 so that RNG 312 can send a data stream and/or sequence to comparator 314 for comparison with another data stream and/or sequence at the second input of the comparator 314. (In the Figures, connections between components may be shown with arrows which, while intended to assist in understanding the flow of communications and/or data between components, do not limit the direction of communications/data flow in the invention. Connections between components can be implemented in a variety of ways known to those skilled in the art and are not limited to those shown and described herein for illustrative purposes.) The output of the comparator 314 is connected to the enabling signal generator 318. The authorization system of the present invention generates a configurable device authorization code and a secure device authorization code which are inputs to the comparator 314. When these authorization code inputs are identical, the signal generator 318 outputs a signal to the user logic 319 to enable the user logic, as appropriate. When the authorization code inputs to the comparator 314 are not identical or when at least one of the inputs is missing, the user logic 319 remains disabled and unusable.

A secure EEPROM PLD 330 has a pseudo-random number generator 332 that is a duplicate of RNG 312, a data interface 333 and a control module 339. A suitable data link 320 connects the devices 310, 330 and permits transmission of data between the devices. A configuration data memory 340 is connected to the EEPROM PLD 330 by a suitable secure link 341 that permits control and transmission of the configuration data in memory 340 by the EEPROM PLD 330 as described herein and as is well known to those skilled in the art. The control module 339 is configured to send the configuration data via interface 333, link 320 and interface 313 to configure the user logic 319 of SRAM PLD 310. This configuring of the user logic module 319 is well known in the art. Moreover, in addition to the user logic 319, the configuration data in memory 340 configures authorization system components and/or functionalities to be used in accordance with the present invention to authenticate, verify or otherwise authorize use of the configuration data by the SRAM PLD 310.

According to one embodiment of the present invention, a seed is provided by either of the devices (or from any other suitable source) to initiate parallel operation of the devices' respective pseudo-random number generators 312, 332. As seen in FIG. 3A, the seed generator may be located in one or more alternate locations, including, for example, at a generator 311 in the SRAM PLD 310, a generator 331 in the EEPROM PLD, or in a generator 343 external to the SRAM PLD 310 and EEPROM PLD 330. Throughout the description of and drawings pertaining to the invention, such seeding is presumed wherever appropriate. The locations and techniques for implementing such seeding are well known to those of skill in the art. For example, in one embodiment, an initiating bitstream from the EEPROM PLD 330 includes the seed for the SRAM PLD RNG 312 and the EEPROM PLD RNG 332. In the embodiment shown in FIG. 3A, the output of RNG 312 is the configurable device authorization code and the output of RNG 332 is the secure device authorization code. (In this disclosure, one authorization signal sent from the secure device to the configurable device via link 320 may be referred to as the "secure device signal" while one input to the comparator will be referred to as the "secure device authorization code." The secure device authorization code is a data stream and/or sequence based on the secure device signal; that is, the secure device authorization code is either identical to the secure device signal or derived from the secure device signal through one or more data manipulation techniques, such as decryption.)

Figure 3B:
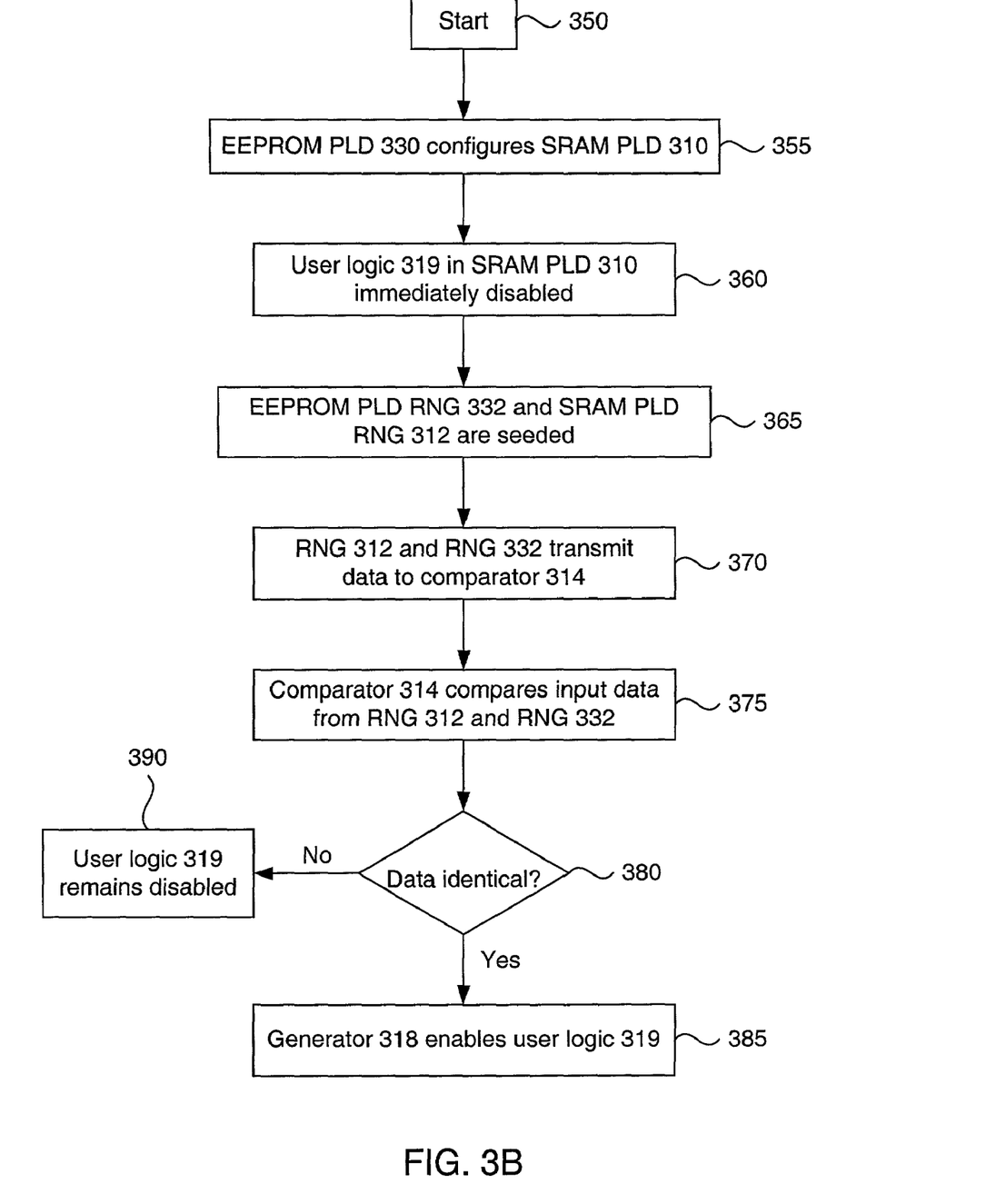
FIG. 3B is a block flow diagram showing a method for controlling use of configuration data in connection with a programmable device according to one embodiment of the present invention.

One method of the present invention, usable with the system of FIG. 3A, is shown in FIG. 3B. The method starts at 350 and at 355 the secure device 330 transmits the configuration data to the SRAM PLD 310 to configure the SRAM PLD 310. Immediately after completion of the configuring of SRAM PLD 310, the user logic 319 of SRAM PLD 310 is disabled at 360. At 365 the EEPROM PLD RNG 332 and the SRAM PLD RNG 312 are seeded. At 370 the two duplicate RNGs 312, 332 begin sending their respective data inputs to the comparator 314 which compares the data at 375. Again, RNG 312 generates and sends the configurable device authorization code and RNG 332 generates and sends the secure device authorization code. At decision 380, if the data from the RNGs 312, 332 match, the user logic 319 of SRAM PLD 310 is enabled 385. If the data do not match, or if data for at least one of the inputs for the comparator 314 is missing, the user logic 319 remains disabled 390.

Figure 4A:
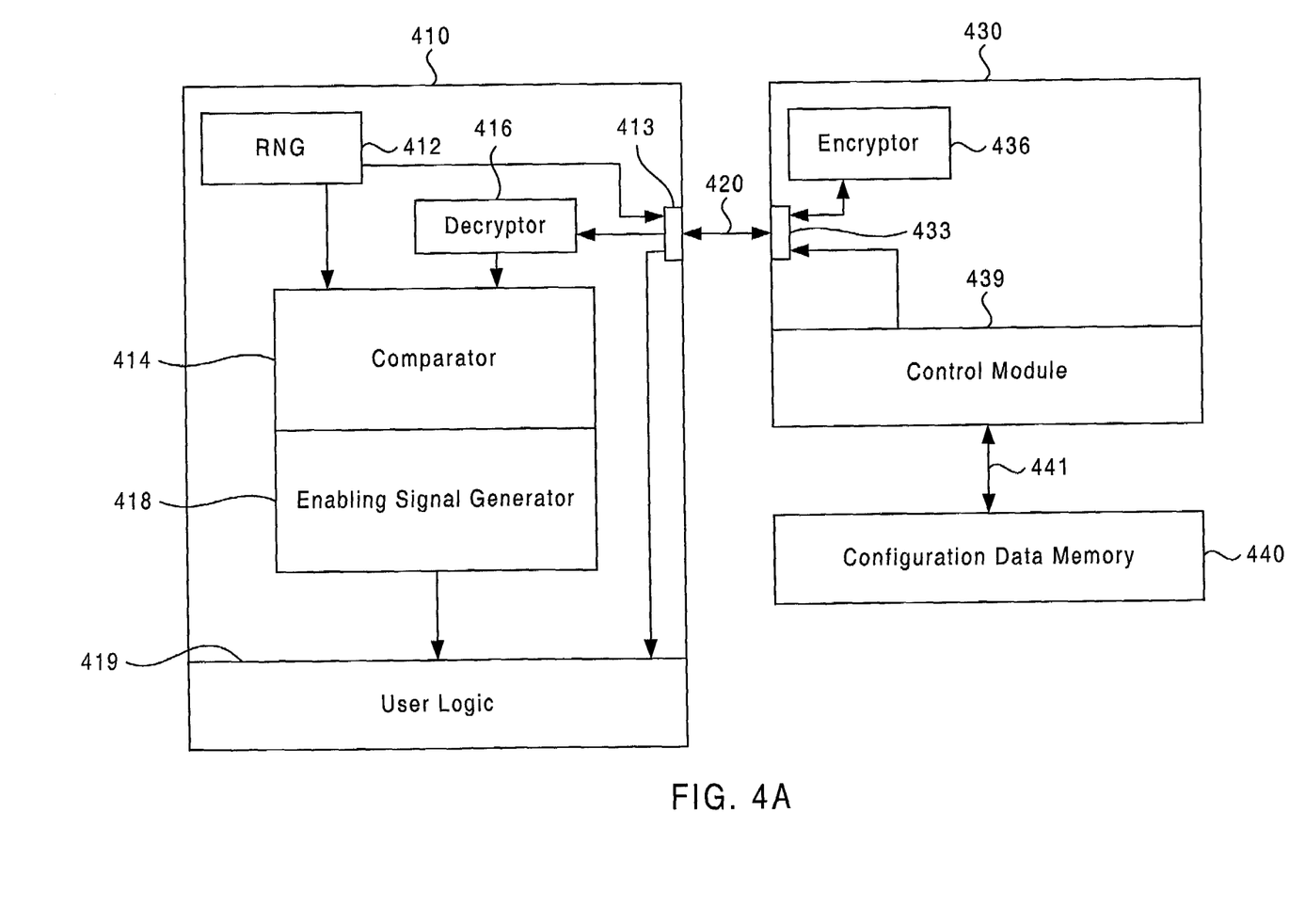
FIG. 4A is a schematic diagram of another embodiment of the present invention.

Another embodiment of the present invention is shown in FIG. 4A. An SRAM PLD 410 again possesses an RNG 412 connected directly to a comparator 414 and to a communication interface 413. The output of RNG 412 sent to the comparator 414 is the configurable device authorization code. A communication link 420 connects the SRAM PLD 410 to the interface 433 of an EEPROM PLD 430 that includes a control module 439 and an encryption engine or other encryptor 436. EEPROM PLD 430 is connected by secure link 441 to a configuration data memory 440. The data generated by the SRAM PLD RNG 412 can be sent to the encryptor 436 of the EEPROM PLD 430, encrypted and sent back to the SRAM PLD 410 via link 420. The encrypted data, a secure device signal, is sent to a decryptor 416 in the SRAM PLD 410, which is configured to decrypt data from the EEPROM PLD 430 and feed the decrypted data to the comparator 414. The output of decryptor 416 is the secure device authorization code. Again, if the inputs of comparator 414 match, the enabling signal generator 418 enables previously disabled user logic 419. If the data do not match, or if data for at least one of the inputs for the comparator 414 is missing, the user logic 419 remains disabled.

Figure 4B:
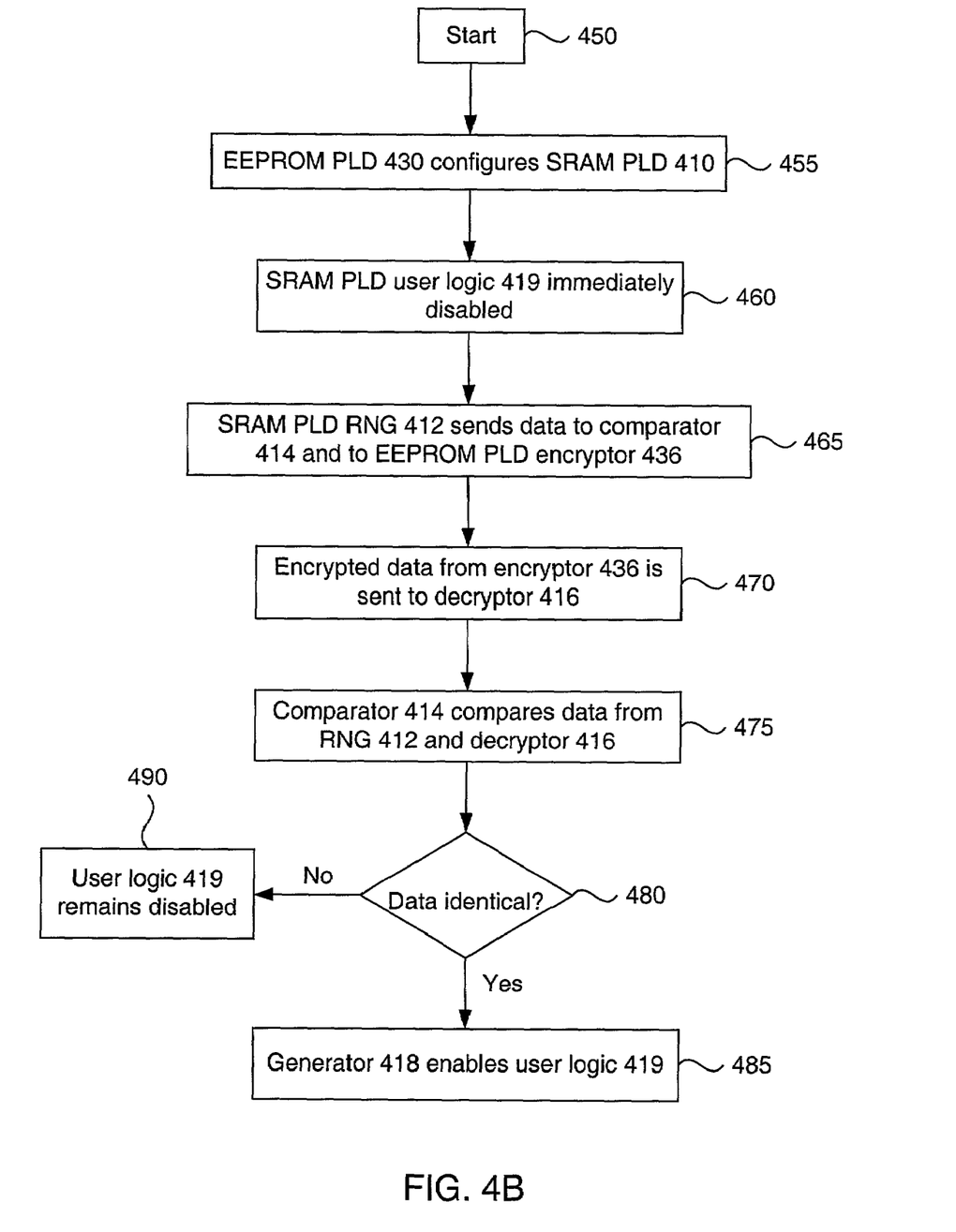
FIG. 4B is a block flow diagram showing another method for controlling use of configuration data in connection with a programmable device according to one embodiment of the present invention.

FIG. 4B shows another method of the invention usable with the system illustrated in FIG. 4A. After starting 450, the EEPROM PLD 430 configures the SRAM PLD 410 at 455. Again, the SRAM PLD user logic 419 is immediately disabled at 460. At 465 the RNG 412 of SRAM PLD 410 sends its data, the configurable device authorization code, directly to comparator 414 and to the encryptor 436 in EEPROM PLD 430. The encrypted data from encryptor 436, the secure device signal, is sent back to the SRAM PLD 410 via link 420 and is decrypted by decryptor 416 at 470. At 475 the comparator 414 compares the data received directly from the RNG 412 with the decrypted data output from decryptor 416, the secure device authorization code. At decision 480, if the data match, then the authorization indication signal generator 418 enables the SRAM PLD 410 for operation at 485. If the authorization code data do not match at decision 480, or if data for at least one of the inputs for the comparator 414 is missing, then the user logic 419 of SRAM PLD 410 remains disabled and unusable at 490.

Figure 5A:
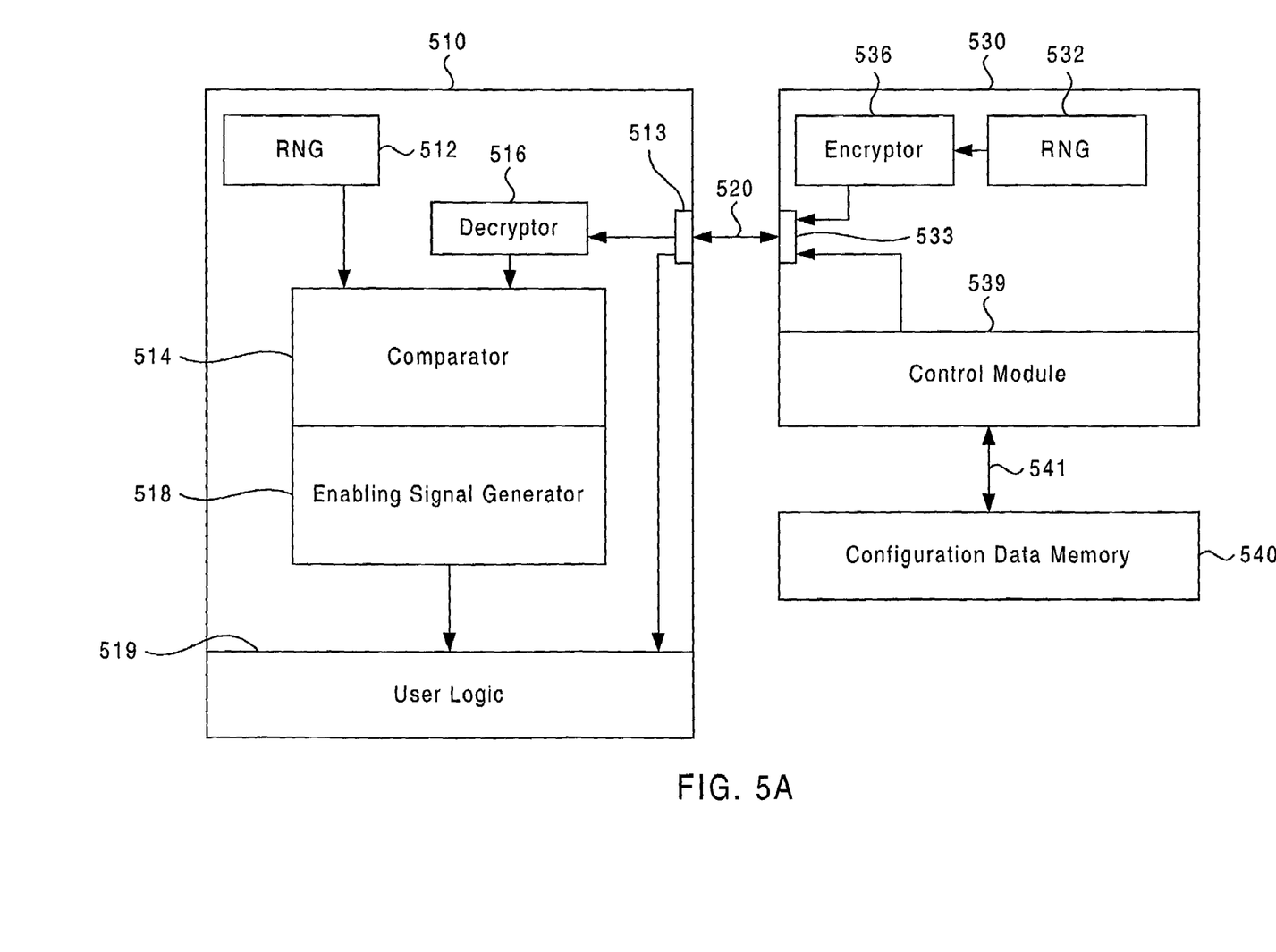
FIG. 5A is a schematic diagram of a different embodiment of the present invention.

FIG. 5A shows another embodiment of the present invention. An SRAM PLD 510 again possesses an RNG 512 connected directly to a comparator 514. A communication link 520 connects the SRAM PLD interface 513 to the EEPROM PLD interface 533. EEPROM PLD 530 includes a control module 539 connected by a secure link 541 to a configuration data memory 540 and an encryption engine or other encryptor 536 connected to an RNG 532 that is a duplicate of RNG 512 (again identical seeding of the RNGs 512, 532 is used to achieve duplicate RNG outputs). The data generated by the EEPROM PLD RNG 532 is sent to the encryptor 536, encrypted and transmitted as the secure device signal to the decryptor 516 in SRAM PLD 510 via interface 533, link 520 and interface 513. Decryptor 516 is configured to decrypt data from the encryptor 536 of EEPROM PLD 530. Decryptor 516 transmits its output, the secure device authorization code, to the comparator 514. If the output of RNG 512 (the configurable device authorization code) and the output of decryptor 516 (the secure device authorization code) are identical, then the enabling signal generator 518 enables the user logic 519. If the inputs to comparator 514 do not match, or if data for one or both of the inputs for the comparator 514 is missing, the SRAM PLD user logic 519 remains disabled.

Figure 5B:
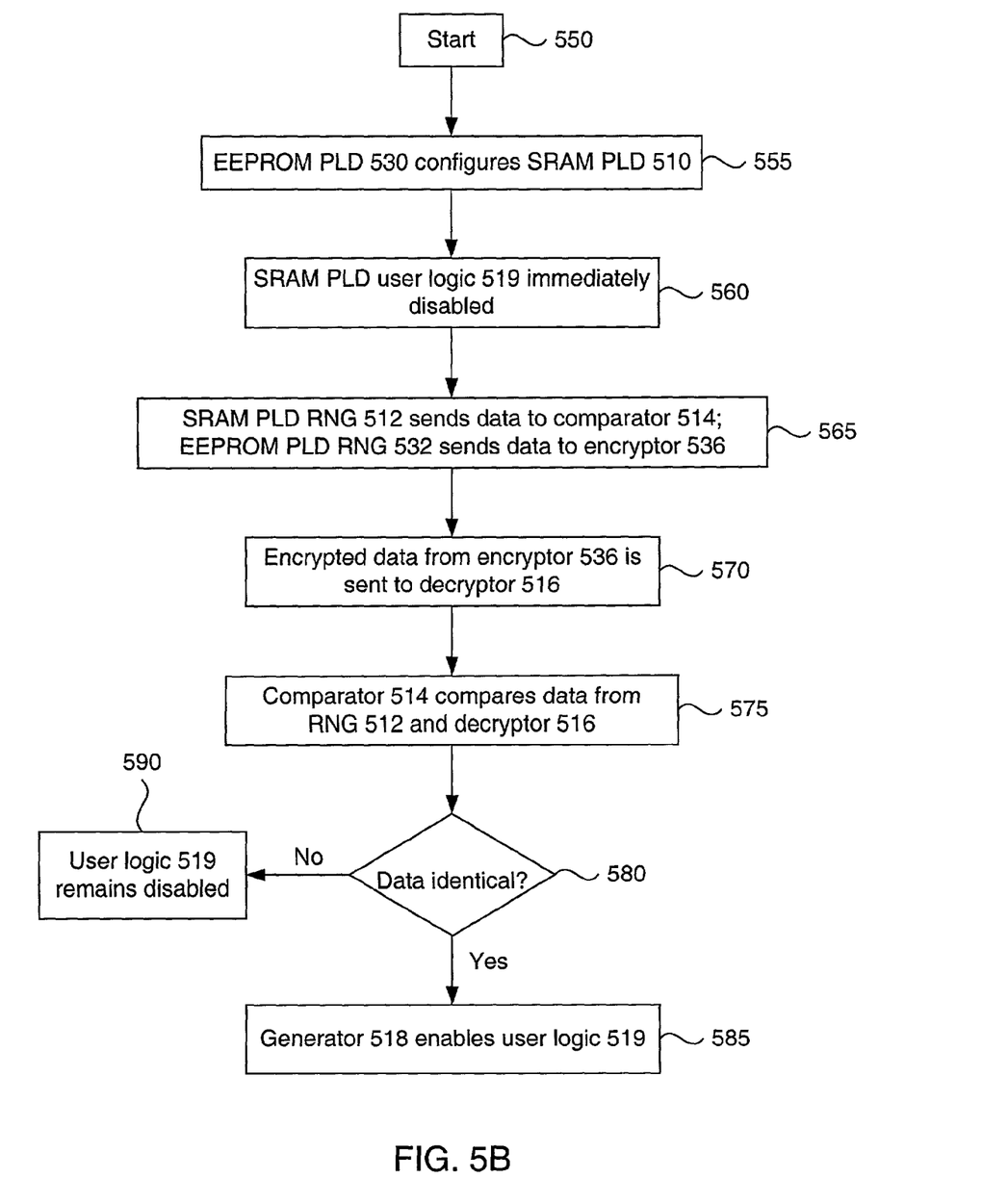
FIG. 5B is a block flow diagram showing a different method for controlling use of configuration data in connection with a programmable device according to one embodiment of the present invention.

FIG. 5B shows a method of the invention usable with the system illustrated in FIG. 5A. After starting 550, the EEPROM PLD 530 configures SRAM PLD 510 at 555. Again, the user logic 519 of SRAM PLD 510 is immediately disabled at 560. At 565 the RNG 512 of SRAM PLD 510 sends its data directly to comparator 514 as the configurable device authorization code while RNG 532 of EEPROM PLD 530 sends its data to the encryptor 536 in EEPROM PLD 530. The encrypted data from encryptor 536 is sent as a secure device signal by interface 533 to the SRAM PLD 510 via link 520 and interface 513 and is decrypted by decryptor 516 at 570. At 575 the comparator 514 compares the data received directly from the RNG 512, the configurable device authorization code, with the data output from decryptor 516, the secure device authorization code. At decision 580, if the data from RNG 512 and decryptor 516 match, then the enabling signal generator 518 enables the user logic 519 of SRAM PLD 510 for operation at 585. If the inputs to comparator 514 do not match, or if data for one or both of the inputs for the comparator 514 is missing, the SRAM PLD user logic 519 remains disabled at 590.

In systems, methods and apparatus such as those disclosed and claimed herein, additional security typically requires the use of additional resources in the configurable device and/or the secure device. A user or IP owner can decide in any given case whether the cost of additional security is warranted.

In addition, a comparator in configurations such as those disclosed and claimed herein can alternatively be configured to initiate a disabling signal from a disabling signal generator if the SRAM PLD user logic remains in an operational mode after programming by the secure device. For example, an error bit can be set by a disabling signal generator to disable the SRAM PLD. The error bit may be used to tristate outputs, stop operation of a state machine or in any other way prevent unauthorized use of the programmed SRAM PLD. In this situation, the disabling signal would be sent if an incorrect or no authorization code or other communication is received from the secure device.

Figure 6A:
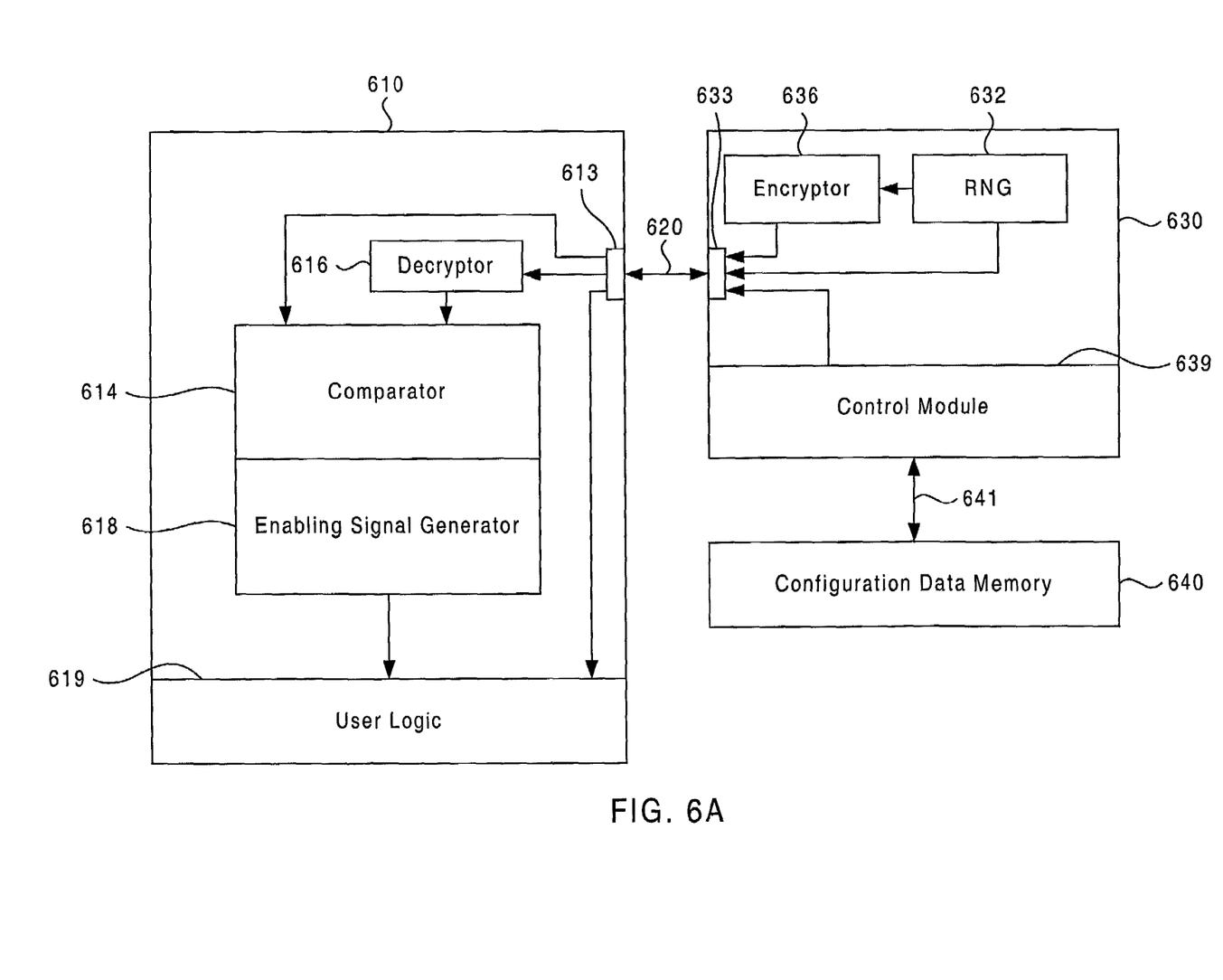
FIG. 6A is a schematic diagram of one other embodiment of the present invention.

Another embodiment of the present invention is shown in FIG. 6A. EEPROM PLD 630 again has a control module 639 and is connected to a configuration memory 640 via a secure link 641. The SRAM PLD 610 does not possess its own RNG, but has an interface 613 connected directly to comparator 614 and to decryptor 616, the output of which is connected to one input of the comparator 614. Link 620 connects the interface 613 of the SRAM PLD 610 to the interface 633 of EEPROM PLD 630. EEPROM PLD 630 has an RNG 632 that preferably generates a continuous data stream with one output of RNG 632 going directly to interface 633 and another output connected to an encryptor 636. The output of encryptor 636 also is connected to the interface 633.

The RNG 632 thus can send continuous plaintext and encrypted data streams to the interface 633 through link 620 to the interface 613 of the SRAM PLD 610. As will be appreciated by those of skill in the art, continuous data streams are used to make capture and use of the configuration data and/or authorization codes more difficult or impossible by unauthorized users. The data stream from RNG 632 is transmitted as plaintext to one input of the comparator 614 as the secure device authorization code. An encrypted version of the same data is sent by encryptor 636 to the decryptor 616.

The output of decryptor 616 is the configurable device authorization code and is sent to the other input of the comparator 614, which compares its two inputs. If the output of RNG 632 and the output of decryptor 616 are identical, then the enabling signal generator 618 enables the user logic 619. If the inputs to comparator 614 do not match, or if data for one or both of the inputs for the comparator 614 is missing, the SRAM PLD user logic 619 remains disabled.

Figure 6B:
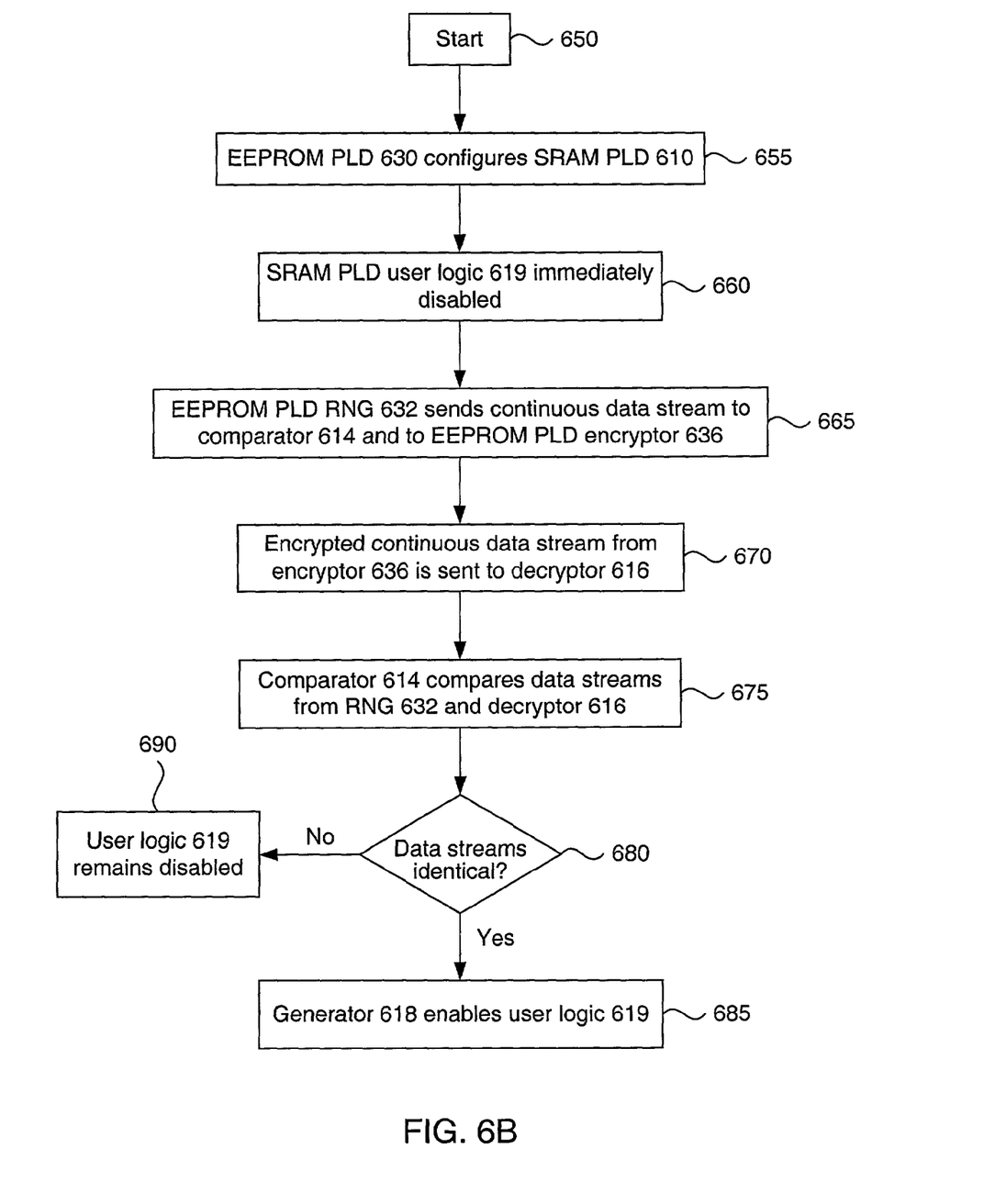
FIG. 6B is a block flow diagram showing one other method for controlling use of configuration data in connection with a programmable device according to one embodiment of the present invention.

FIG. 6B shows one method of the present invention usable with the system illustrated in FIG. 6A. After starting 650, the EEPROM PLD 630 configures SRAM PLD 610 at 655. Again, the user logic 619 of SRAM PLD 610 is immediately disabled at 660. At 665 the RNG 632 of EEPROM PLD 630 sends a continuous data stream to the input of encryptor 636 and directly to one input of comparator 614 in SRAM PLD 610. At 670 the continuous encrypted data stream from the output of encryptor 636 is sent to the input of decryptor 616 where it is decrypted. The comparator 614 compares the continuous data output of decryptor 616 (the configurable device authorization code) with the continuous data stream received from the RNG 632 (the secure device authorization code) at 675. At decision 680, if the data streams input to comparator 614 match, then enabling signal generator 618 enables the user logic 619 of SRAM PLD 610 for operation at 685. If the inputs to comparator 614 do not match, or if data for one or both of the inputs for the comparator 614 is missing, the SRAM PLD user logic 619 remains disabled at 690.

As noted above, any appropriate encryption and decryption engines (or other data manipulation techniques) can be used in connection with the present invention. The techniques used must allow the configurable device to verify the identity of the secure device. Therefore, reversible encryption/decryption algorithms can be used. However, other data manipulation techniques will be obvious to one of ordinary skill in the art and may be employed as appropriate. Allocation of resources between the configurable device and the secure device might affect this decision and can be evaluated on a case by case basis, depending on the application the user has in mind for the system. If encryption and decryption are used specifically, those skilled in the art will be aware of a number of encryption algorithms and techniques.

EEPROM PLD architecture does not always lend itself well to implementation of encryption algorithms. Moreover, simpler encryption algorithms (appropriate for EEPROM PLDs) and limits on keys and other elements also can limit the effectiveness of this type of security system. However, optimal encryption algorithms suitable to this type of system will be apparent to those skilled in the art. Because such an algorithm is parameterized and will be unknown to an external party, the algorithm will be much more resistant to known plaintext and differential cryptanalysis attacks. The systems, methods and apparatus disclosed and claimed here exploit the fact that it is difficult to reverse engineer a design from the configuration bit-stream. Such systems, methods and apparatus typically require a simple, secure programmable device such as an EEPROM PLD or embedded microcontroller with security bits.

Generally, it is sufficient that a pseudo-random sequence used in connection with the present invention satisfy the following two criteria—(1) be of sufficient length to make capturing the entire sequence impractical, and (2) be sufficiently difficult to determine the seeds (or keys) to any pseudo-random sequence generator used, even if the architecture and configuration of the sequence generator are known.

While it is never possible to guarantee absolute security, the systems, methods and apparatus described and claimed herein make the SRAM FPGA design as secure (or very close to as secure) from duplication as it would be if implemented in a more secure technology such as Antifuse FPGA, EEPROM PLD or custom ASIC.

The many features and advantages of the present invention are apparent from the written description and drawings, and thus, the appended claims are intended to cover all such features and advantages of the invention. Further, since numerous modifications and changes will readily occur to those skilled in the art, the present invention is not limited to the exact construction and operation as illustrated and described. Hence, all suitable modifications and equivalents are deemed to fall within the scope of the invention.

We claim:

1. A method for controlling use of configuration data comprising:
    programming a configurable device using the configuration data provided by a secure device, the configuration data associated with an intellectual property block for implementing user logic on the configurable device, wherein the user logic includes functions associated with a user design for implementation on the configurable device;
    disabling user logic provided for implementation of the configuration data after it is loaded onto the configurable device, wherein an error bit is set by a disabling signal generator to disable user logic;
    generating a configurable device authorization code;
    generating a secure device authorization code;
    comparing the configurable device authorization code and the secure device authorization code; and
    enabling the user logic if the configurable device authorization code corresponds to the secure device authorization code.

2. The method of claim 1 wherein:
    generating the configurable device authorization code comprises generating a first sequence as the configurable device authorization code in a pseudo-random number generator in the configurable device; and
    generating the secure device authorization code comprises:
        generating a second sequence in a pseudo-random number generator in the secure device;
        transmitting the second sequence to an encryptor in the secure device;
        encrypting the second sequence to generate a third sequence;
        transmitting the third sequence to a decryptor in the configurable device; and
        decrypting the third sequence to generate a fourth sequence, wherein the fourth sequence is the secure device authorization code.

3. The method of claim 2 wherein the configurable device is an SRAM PLD.

4. The method of claim 2 wherein the secure device is an EEPROM PLD.

5. The method of claim 2 wherein the pseudo-random number generator in the secure device is a duplicate of the pseudo-random number generator in the configurable device and both pseudo-random number generators are seeded using the same seed.

6. The method of claim 1 wherein:
    generating the configurable device authorization code comprises generating a first sequence as the configurable device authorization code in a pseudo-random number generator in the configurable device; and generating the secure device authorization code comprises generating a second sequence as the secure device authorization code in a pseudo-random number generator in the secure device.

7. The method of claim 6 wherein the configurable device is an SRAM PLD.

8. The method of claim 6 wherein the secure device is an EEPROM PLD.

9. The method of claim 6 wherein the pseudo-random number generator in the secure device is a duplicate of the pseudo-random number generator in the configurable device and both pseudo-random number generators are seeded using the same seed.

10. The method of claim 1 wherein:
generating the configurable device authorization code comprises generating a first sequence as the configurable device authorization code in a pseudo-random number generator in the configurable device;
generating the secure device authorization code comprises:
transmitting the first sequence to an encryptor in the secure device;
encrypting the first sequence to generate a second sequence;
transmitting the second sequence to a decryptor in the configurable device; and
decrypting the second sequence to generate a third sequence, wherein the third sequence is the secure device authorization code.

11. The method of claim 10 wherein the configurable device is an SRAM PLD.

12. The method of claim 10 wherein the secure device is an EEPROM PLD.

13. The method of claim 1 wherein:
generating the secure device authorization code comprises generating a first sequence as the secure device authorization code in a pseudo-random number generator in the secure device;
generating the configurable device authorization code comprises:
transmitting the first sequence to an encryptor in the secure device;
encrypting the first sequence to generate a second sequence;
transmitting the second sequence to a decryptor in the configurable device; and
decrypting the second sequence to generate a third sequence, wherein the third sequence is the configurable device authorization code.

14. A method for controlling use of configuration data comprising:
programming a configurable device using the configuration data provided by a secure device, the configuration data associated with an intellectual property block for implementation using user logic and for configuring authorization system components on the configurable device, wherein the user logic includes functions associated with a user design for implementation on the configurable device;
disabling user logic provided for implementation of the configuration data after it is loaded onto the configurable device;
generating a configurable device authorization code using the configurable device sequence generator;
generating a first sequence in a secure device sequence generator in the secure device;
encrypting the first sequence in an encryptor in the secure device to generate a second sequence;
transmitting the second sequence to a decryptor in the configurable device;
decrypting the second sequence to generate a third sequence;
comparing the secure device authorization code and the configurable device authorization code; and
enabling the user logic if the configurable device authorization code corresponds to the secure device authorization code.

15. A method for controlling use of configuration data comprising:
programming a configurable device using the configuration data provided by a secure device, the configuration data associated with an intellectual property block for implementation using user logic on the configurable device, wherein the user logic includes functions associated with a user design for implementation on the configurable device;
disabling user logic provided for implementation of the configuration data after it is loaded onto the configurable device, wherein an error bit is set by a disabling signal generator to disable user logic;
generating a configurable device authorization code in the configurable device authorization code generator;
generating a secure device authorization code in a secure device authorization code generator in the secure device;
comparing the configurable device authorization code and the secure device authorization code; and
enabling the user logic if the configurable device authorization code corresponds to the secure device authorization code.

16. A system for controlling use of configuration data, the system comprising a secure device and a configurable device, the system further comprising:
user logic in the configurable device, wherein the user logic includes functions associated with a user design for implementation on the configurable device, the user logic implemented using configuration data associated with an intellectual property block and disabled upon implementation on the configurable device;
a secure device authorization code generator configured to generate and transmit a secure device authorization code as a first input to the comparator;
a configurable device authorization code generator configured to generate and transmit a configurable device authorization code as a second input to the comparator; and,
a disabling signal generator configured to send an error bit to disable user logic;
wherein user logic is enabled if the secure device authorization code corresponds to the configurable device authorization code.

17. The system of claim 16 wherein:
the configurable device generator comprises a sequence generator in the configurable device; and
the secure device generator comprises:
a sequence generator in the secure device;
an encryptor coupled to the secure device sequence generator and configured to encrypt a first sequence generated by the secure device sequence generator to generate a second sequence; and
a decryptor in the configurable device, the decryptor coupled to the encryptor and configured to decrypt the second sequence to generate a third sequence and to transmit the third sequence as the secure device authorization code to the first input of the comparator.

18. The system of claim 17 wherein the configurable device sequence generator and the secure device sequence generator are pseudo-random number generators and further wherein the configurable device pseudo-random number generator is a duplicate of the secure device pseudo-random number generator.

19. The system of claim 18 wherein the pseudo-random number generators are seeded using the same seed.

20. The system of claim 17 wherein the configurable device is an SRAM PLD.

21. The system of claim 17 wherein the secure device is an EEPROM PLD.

22. The system of claim 16 wherein:
the configurable device authorization code generator comprises a sequence generator in the configurable device; and
the secure device authorization code generator comprises a sequence generator in the secure device.

23. The system of claim 22 wherein the configurable device sequence generator and the secure device sequence generator are pseudo-random number generators and further wherein the configurable device pseudo-random number generator is a duplicate of the secure device pseudo-random number generator.

24. The system of claim 23 wherein the pseudo-random number generators are seeded using the same seed.

25. The system of claim 22 wherein the configurable device is an SRAM PLD.

26. The system of claim 22 wherein the secure device is an EEPROM PLD.

27. The system of claim 16 wherein:
the configurable device authorization code generator comprises a sequence generator in the configurable device configured to generate a first sequence as the configurable device authorization code; and
the secure device authorization code generator comprises:
an encryptor in the secure device, the encryptor configured to receive and encrypt the first sequence to generate a second sequence; and
a decryptor in the configurable device, the decryptor configured to receive and decrypt the second sequence to generate a third sequence and to transmit the third sequence as the secure device authorization code to the comparator.

28. The system of claim 27 wherein the configurable device sequence generator is a pseudo-random number generator.

29. The system of claim 27 wherein the configurable device is an SRAM PLD.

30. The system of claim 27 wherein the secure device is an EEPROM PLD.

31. The system of claim 16 wherein:
the secure device authorization code generator comprises a sequence generator in the secure device configured to generate a first sequence as the secure device authorization code; and
the configurable device authorization code generator comprises:
an encryptor in the secure device, the encryptor configured to receive and encrypt the first sequence to generate a second sequence; and
a decryptor in the configurable device, the decryptor configured to receive and decrypt the second sequence to generate a third sequence and to transmit the third sequence as the configurable device authorization code to the comparator.

* * * * *